(12) United States Patent
Palm et al.

(10) Patent No.: US 10,377,302 B2
(45) Date of Patent: Aug. 13, 2019

(54) VEHICLE WITH OVERHEAD VEHICLE STATE INDICATION

(71) Applicant: Volvo Car Corporation, Göteborg (SE)

(72) Inventors: Niklas Palm, Göteborg (SE); Thomas Lienhart, Göteborg (SE); Per Ekeroth, Göteborg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 16/151,379

(22) Filed: Oct. 4, 2018

(65) Prior Publication Data

US 2019/0111837 A1 Apr. 18, 2019

(30) Foreign Application Priority Data

Oct. 16, 2017 (EP) .................................. 17196566

(51) Int. Cl.
*B60Q 3/70* (2017.01)
*B60Q 3/80* (2017.01)
(Continued)

(52) U.S. Cl.
CPC ............... *B60Q 3/70* (2017.02); *B60Q 3/64* (2017.02); *B60Q 3/80* (2017.02); *G02B 27/01* (2013.01); *G02B 27/0101* (2013.01)

(58) Field of Classification Search
CPC ............... B60J 7/00; B60K 2350/922; B60K 2350/925; B60Q 1/2611; B60Q 1/268;
(Continued)

(56) References Cited

U.S. PATENT DOCUMENTS 3,522,980 A 8/1970 Lones
5,469,298 A 11/1995 Suman et al.
(Continued)

FOREIGN PATENT DOCUMENTS

GB   1297940 A    11/1972
WO   0237167 A1   5/2002
WO   2012143701 A1 10/2012

OTHER PUBLICATIONS

Apr. 23, 2018 European Search Report issue on International Application No. 17196566.8.

*Primary Examiner* — Brian Wilson
(74) *Attorney, Agent, or Firm* — Clements Bernard Walker PLLC; Christopher L. Bernard

(57) ABSTRACT

A vehicle comprising an optically transmissive roof window, an overhead console arranged in an overhead position with respect to a driver position in the vehicle, an optical element attached to a rear portion of the overhead console, the optical element facing the roof window, a light source for emitting light receivable by the optical element, the light source is configure to emit the light when an electric system of the vehicle is powered on. The optical element is arranged to receive at least a portion of the light emitted by the light source such that an image representative of the optical signal and the shape of the optical element is visible through the roof window from the interior of the vehicle. The invention further relates to a method for providing an image indicative of a state of a vehicle.

15 Claims, 3 Drawing Sheets

(51) Int. Cl.
*B60Q 3/64* (2017.01)
*G02B 27/01* (2006.01)

(58) Field of Classification Search
CPC . B60Q 3/12; B60Q 3/14; B60Q 3/208; B60Q 3/51; B60Q 3/54; B60Q 3/64; B60Q 3/70; B60Q 3/80; B60R 1/00; B60R 2300/205; B60R 2300/70; B60W 50/14; B60W 2050/146; B60Y 2400/92; B62D 25/06; G01C 21/365; G02B 27/01; G02B 2027/0101; G02B 2027/0109; G02B 2027/0141; G03B 21/145; G03B 21/56; G03B 21/60; G03B 29/00; G03B 21/32; G06T 3/005
USPC ............................................................ 349/11
See application file for complete search history.

(56) References Cited

U.S. PATENT DOCUMENTS

| | | | | |
|---|---|---|---|---|
| 7,284,886 | B2* | 10/2007 | Chen | B62D 25/06 362/488 |
| 8,941,690 | B2* | 1/2015 | Seder | G02B 27/01 340/438 |
| 10,166,996 | B2* | 1/2019 | Ishihara | B60W 50/14 |
| 2008/0272623 | A1* | 11/2008 | Kadzban | B60J 7/00 296/216.01 |
| 2013/0235351 | A1* | 9/2013 | Sachdev | B60R 1/00 353/13 |
| 2014/0168608 | A1* | 6/2014 | Disley | G03B 29/00 352/132 |
| 2018/0086260 | A1* | 3/2018 | Barillot | B60Q 3/51 |
| 2018/0211414 | A1* | 7/2018 | Cronin | B60K 35/00 |
| 2019/0077313 | A1* | 3/2019 | Kanaguchi | B60R 1/002 |

* cited by examiner

VEHICLE WITH OVERHEAD VEHICLE STATE INDICATION

CROSS-REFERENCE TO RELATED APPLICATION

The present patent application/patent claims the benefit of priority of co-pending European Patent Application No. 17196566.8, filed on Oct. 16, 2017, and entitled "VEHICLE WITH OVERHEAD VEHICLE STATE INDICATION," the contents of which are incorporated in full by reference herein.

FIELD OF THE INVENTION

The present invention relates to a vehicle comprising an optically transmissive roof window arranged in a roof of the vehicle.

BACKGROUND OF THE INVENTION

Modern vehicles generally have multiple assist systems. The assist systems may be related to driver assist system to support the driver in driving the vehicle, for example monitoring that the vehicle stays in the lane, or that a distance to the vehicle in front is kept over a safe threshold distance. Other types of assist system may provide driving directions or transmission gear suggestions.

Most of the assist systems provide visual indications or warnings. The indications or warnings require space in the interior of the vehicle, and in particular in a location such that the indications or warnings are visible to the driver of the vehicle.

Traditionally, the indications or warnings have been provided by visual indicators on the dashboard of the vehicle. More recently, head-up display systems have emerged on the market for vehicles other than airplanes which have had head-up displays for decades; in particular fighter planes have employed head up displays for many years.

Generally, a head up display is configured to project visual information in the windshield of the vehicle in front of the driver such that the user should not have to refocus with the eyes when changing viewpoint from looking at the displayed information to a viewpoint behind the displayed information. This is of course an important feature if the driver is required to read the information at the same time as driving the vehicle.

However, as the amount of information to be displayed increases, the space available for displaying the information becomes more cramped. Furthermore, some of the information may not be critical for the driver or passengers of the vehicle at all times, and may in some cases even distract the driver. Thus, there is a need for further displaying options for providing vehicle information to occupants in a vehicle, and in some cases to occupants outside the vehicle.

SUMMARY OF THE INVENTION

In view of above-mentioned prior art, it is an object of the present invention to provide a vehicle with improved display options for providing indications of the state of the vehicle.

According to a first aspect of the invention, there is provided a vehicle comprising: an optically transmissive roof window arranged in a roof of the vehicle; a overhead console arranged in an overhead position with respect to a driver position in the vehicle, the overhead console is attached to the vehicle interior in a frontal location in the vehicle with respect to the roof window, wherein a rear portion of the overhead console extends under the roof window such that a vertical gap is formed between the roof window and an upper surface of the rear portion, the upper surface facing the roof window, an optical element attached to the rear portion of the overhead console, the optical element facing the roof window, a light source arranged in the rear portion of the overhead console for emitting light receivable by the optical element, wherein said light source is configure to emit the light when an electric system of the vehicle is powered on, wherein the optical element is arranged to receive at least a portion of the light emitted by the light source such that the optical element is illuminated by the emitted light which causes an optical signal to be emitted from the optical element towards the roof window such that an image representative of the optical signal and the shape of the optical element is visible in the roof window from the interior of the vehicle and, wherein the image is indicative of a state of the vehicle.

The present invention is based on the realization that there is available space between an overhead console and a roof window of a vehicle for arrangement of an optical element. The arrangement of the optical element provides for an image to be displayed as a projection in the roof window. The rear portion of the overhead console facing the roof window is normally not used for any particular application and may not be easily accessible due that the gap between the roof window and the overhead console generally is a relatively cramped space. However, according to the inventive concept the rear portion provides an advantageous location for arranging the optical element.

By allowing the optical signal from the optical element to be displayed as an image projection through the roof window, the otherwise not easily accessible space of the rear portion of the overhead console is thus advantageously used for providing additional displaying options for providing indications to occupants of the vehicle. Thus, the roof window which otherwise is traditionally only used for allowing light to enter the interior of the vehicle, and possibly also for esthetic purposes, may also be used for providing additional display space for displaying information to the occupants of the vehicle.

Furthermore, the optical element is located relatively close to and below the roof window. Consequently, when the optical element emits the optical signal, the optical element is visible through the roof window from the outside of the vehicle, in particular from a location higher than the location of the vehicle roof.

Accordingly, the inventive concept provides a further advantage of being able to provide indications of the state of the vehicle to someone located outside the vehicle and at a location higher than the vehicle. For example, an occupant may have left the vehicle and may have climbed stairs or an uphill when he/she wishes to check the status of the state of the vehicle according to the inventive concept. Generally, it is not desirable to climb down the stairs or backtrack down the hill to check the state of the vehicle. However, with the inventive concept the state may be checked by visually inspecting the optical element visible through the roof window from the outside of the vehicle.

The vehicle roof window is optically transmissive meaning that the roof window allows at least some light to pass through the window but that some losses in the window is allowable. The roof top window is thus at least semi-transparent such that a person may see through the roof window. The roof window preferably comprises glass. The glass may be coated with solar window film. The overhead console may generally comprise for example a control panel for controlling interior lighting in the vehicle, or other electrical systems, or entertainment systems in the vehicle.

The optical element is configured such that it allows at least part of the light received from the light source to be emitted as an optical signal towards the roof window. The optical element may be provided in the form of a lens, or in some embodiments in the form of an optically diffusive element configured to transmit at least part of the light received from the light source towards the roof window. The optically diffusive element may at least partly spread the light towards the roof window. This provides for a relatively uniform image to be displayed through the roof window. The optical element may be comprised of glass, a polymer, or a semiconductor.

Accordingly, the emitting of the optical signal from the optical element towards the roof window is a process of guiding and reflecting the light received from the inside of the optical element to the outside surface of the optical element facing the roof window.

The light source may be a semiconductor based light source based on the combination of electrons and holes for producing light. The light source preferably comprises at least one light emitting diode (LED).

The light source may be configured to continuously emit light until the electric system is powered off.

The state of the vehicle may be any state desirable to monitor. For example, the image may be displayed when the vehicle is in an unlocked state (i.e. electric system controlling the lock has been powered on), when the vehicle engine is in a turned on state (ignition system is powered on), when the vehicle lighting system is powered on, or when the ambient light system in the vehicle is in a powered state.

Accordingly, the electrical system may be at least one of an ambient light system, an external light system, a door locking system, an ignition system, or a combination thereof.

The image may be representative of the shape of the optical element. For example, if the optical element is provided in the shape of a star, then the image appears as the shape of a star.

It should be noted that the image representative of the optical signal and the shape of the optical element may appear as a projection on an opposite side of the roof window from the rear portion of the overhead console, outside the vehicle.

The vertical gap between the roof window and the upper surface of the rear portion of the overhead console may be any size, however, in most implementations the vertical gap is less than or equal to about 200 mm, 150 mm, 100 mm, about 80 mm, about 50 mm, about 40 mm, about 30 mm, or about 20 mm.

The image representative of the optical signal and the shape of the optical element may be visible to at least a driver of the vehicle.

According to embodiments of the invention, the optical element may be comprised in a waveguide, wherein a main portion of the waveguide is covered by the upper surface of the rear portion of the overhead console, wherein main portion of the waveguide is configured to transmit light received from the light source to the optical element. Accordingly, the light source is configured to emit light towards the main portion of the waveguide, the main portion providing an optical path for the emitted light towards the optical element. The waveguide thus functions as a light guide. The waveguide may be comprised of glass, a polymer, or a semiconductor. Waveguide materials are per se known to the skilled person.

The main part is advantageously covered by the upper surface such that only the relevant information is displayed through the roof window.

However, the main part acting as a waveguide placed under the upper surface also provides for placing the light source under the upper surface. Since the light source is then hidden under the upper surface the light source may be placed in any location under the surface as long as the emitted light reaches the main part of the waveguide. Thus, more flexibility in the assembly of the optical element and light source is provided.

In some embodiments, the overhead console may comprise edge portions connected with the upper surface, wherein an angle between the upper surface and the edge portion is such that the edge portion is a slanted edge. The slanted edges provide for improved visibility of the image for occupants of the vehicle since the field of view from below the overhead console and through the roof window are improved.

The upper surface may lie in a generally horizontal plane. When the vehicle wheels are in the horizontal plane, then the upper surface may lie in a generally horizontal plane. A small deviation from the horizontal plane is allowable.

The shape of optical element may be static, whereby the image is also static. For example, the optical element may be provided in the shape of a star.

In some embodiments, the vehicle may comprise a control unit configured to receive a signal indicative of that the electric system of the vehicle is powered on, and to control the light source to emit light in response to the received signal.

The control unit may further be configured to receive an indication that the electric system is powered off, and in response to receding that indication, control the light source to stop emitting light.

The vehicle may be a car. However, the inventive concept is also applicable to other types of vehicles such as trucks, boats, busses, construction vehicles, etc.

According to a second aspect of the invention, there is provided a method for providing an image indicative of a state of a vehicle, the vehicle comprising: an optically transmissive roof window arranged in a roof of the vehicle; a overhead console arranged in an overhead position with respect to a driver position in the vehicle, the overhead console is attached to the vehicle interior in a frontal location in the vehicle with respect to the roof window, wherein a rear portion of the overhead console extends under the roof window such that a vertical gap is formed between the roof window and an upper surface of the rear portion, the upper surface facing the roof window, an optical element attached to the rear portion of the overhead console, the optical element facing the roof window, a light source arranged in the rear portion of the overhead console, wherein the method comprises: receiving a signal indicative of that an electric system of the vehicle is powered on; emitting light by the light source in response to the signal indicative of that an electric system of the vehicle is powered on, receiving, by the optical element, at least a portion of the emitted light in response to the received light, emitting, by the optical element, an optical signal towards the roof window such that an image representative of the optical signal and the shape of the optical element is visible through the roof window from the interior of the vehicle, wherein the image is indicative of a state of the vehicle.

Effects and features of the second aspect of the invention are largely analogous to those described above in connection with the first aspect of the invention.

In summary, the present invention relates to a vehicle comprising an optically transmissive roof window, an overhead console arranged in an overhead position with respect to a driver position in the vehicle, an optical element attached to a rear portion of the overhead console, the optical element facing the roof window, a light source for emitting light receivable by the optical element, the light source is configure to emit the light when an electric system of the vehicle is powered on. The optical element is arranged to receive at least a portion of the light emitted by the light source such that an image representative of the optical signal and the shape of the optical element is visible through the roof window from the interior of the vehicle. The invention further relates to a method for providing an image indicative of a state of a vehicle.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXAMPLE EMBODIMENTS

Figure 1:
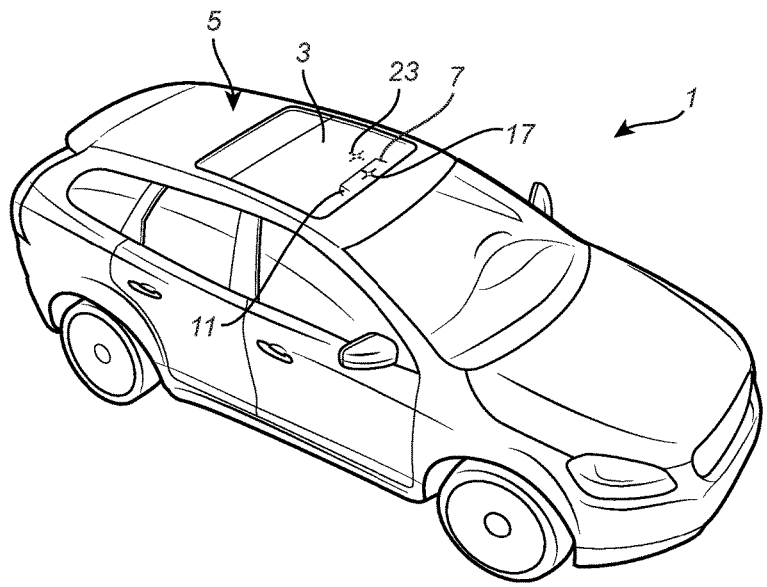
FIG. 1 conceptually illustrates a vehicle according to embodiments of the invention.

In the present detailed description, various embodiments of the system and method according to the present invention are mainly described with reference to integration in a vehicle in the form of a car. However, the present invention may equally be used for any other type of vehicle comprising a roof window such as a truck, a train, a bus, a boat, etc. Thus, this invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1 shows vehicle in the form of a car 1 according to the inventive concept. The car 1 comprises a roof window 3 arranged in the roof 5 of the car 1. The car 1 comprises an overhead console 7 (better seen in FIGS. 2-3) comprising a rear portion 11 which is visible through the roof window 3. In other words, the rear portion 11 of the overhead console 7 extends to under the roof window 3.

There is further shown an optical element 17 attached on the rear portion 11 of the overhead console 7. The optical element 17 faces the roof window 3 such that the optical element 17 is visible through the roof window 3. When the optical element is lit and thus emits an optical signal towards the roof window 3, an image 23 is projected in the roof window 3 and appears "hovering" above the roof window 3 to someone present inside the vehicle. The image 23 resembles the shape of the optical element 17. The image 23 is only visible from inside the vehicle 1 when looking through the roof window and is only shown here in FIG. 1 for illustrative purposes.

However, the optical element 17 is visible from the outside of the car 1 and may thus convey an indication of a state of the vehicle for a person outside the car 1. For example, the light source (no shown, see FIG. 4) may illuminate the optical element 17 such that the optical element 17 is visible through the window as long as the vehicle is unlocked, or the engine is running, or the ambient lighting system of the vehicle is powered on, to mention a few exemplary states of the vehicle for which the inventive concept is applicable.

Figure 2:
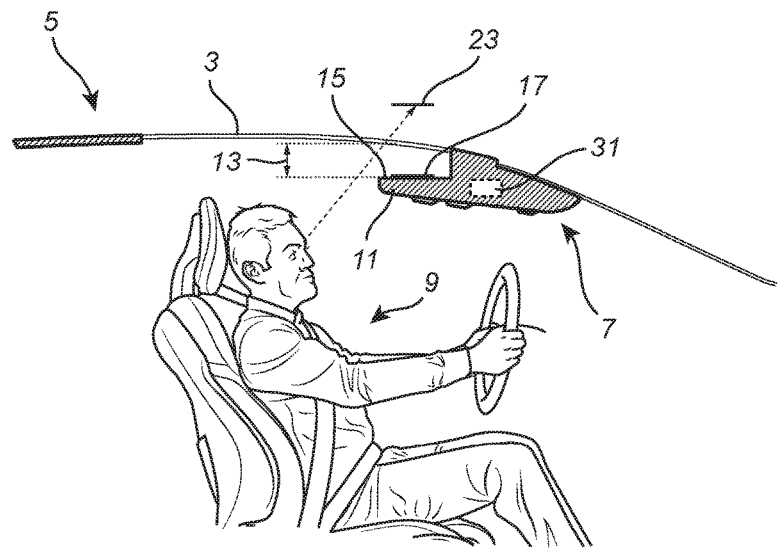
FIG. 2 conceptually illustrates a side view of the interior of a vehicle according to embodiments of the invention.

FIG. 2 illustrates a side view of the interior of the car 1 comprising the roof window 3 in the roof 5 of the car 1. The overhead console 7 is arranged in an overhead position with respect to the driver position 9 in a way such that the overhead console 7 does not block the field of view for the driver for watching the road when the driver operates the car 1. The overhead console 7 is attached to the vehicle interior in the overhead position.

The overhead console 7 may generally comprise various control units or a control panel for controlling various functions in the vehicle. The overhead console 7 may also comprise sensors such as forward looking cameras used for monitoring the surroundings of the vehicle. A rear portion 11 of the overhead console 7 extends to beneath the roof window 3. Thereby, a gap 13 is formed between an upper surface 15 of the rear portion 11 and the roof window 3. The size of the gap 13 may be for example less than or equal to about 200 mm, 150 mm, 100 mm, about 80 mm, about 50 mm, about 40 mm, about 30 mm, or about 20 mm depending on the vehicle model and interior design options, as long as the overhead console 7 does not block the field of view for the driver.

In the gap 13, there is space available in which the optical element 17 is attached. The optical element 17 is arranged such that it faces the roof window 3. When the optical element 17 is illuminated by a light source (not shown), the optical element 17 emits an optical signal towards the roof window. The optical signal is in the shape of the optical element 17. When the optical signal intercepts with the roof window 3, an image 23 is projected in the roof window 3 and is perceived as "hovering" above the roof window by a person inside the car, for example the driver of the car, or a passenger in the car 1. The image 23 is thus a virtual image produced by the projection of the optical signal in the roof window 3. Thus, despite that the optical element 17 is arranged in a relatively cramped space between the rear portion 11 of the overhead console 11 and the roof window, the optical element may be used for providing an image 23 indicative of a state of the vehicle to the person inside the vehicle 1, and as describe above also to someone outside the vehicle 1.

Generally, a virtual image caused by a reflection on a surface appears at a distance behind the reflecting surface which is at the same distance as the distance between the object and the reflecting surface. Accordingly, in this case the image 13 appears at a distance above the roof window 3 which is the same as the distance (may be equal to the size of the gap 3, or at least approximately the same depending on the thickness of the optical element) between the optical element 13 and the roof window 3.

The part of the roof window 3 where the optical signal intercepts the roof window, i.e. directly above the optical element 17 may have a somewhat curved shape.

The image 23 may be a static image 23 such that no unnecessary distraction for the driver is caused.

The vehicle 1 may further comprise a control unit 31 configured to receive a signal indicative of that the electric system of the vehicle is powered on, and to control the light source to emit light in response to the received signal. The control unit 31 is here shown to be arranged in the overhead console 7. However, the control unit 31 may be arranged elsewhere in the vehicle such as behind the dashboard, or elsewhere in the vehicle and is only here shown to the arranged in the overhead console 7 for illustrative purposes.

The control unit 31 may be connected to an electric system of the vehicle for monitoring the state of the electric system and thus of the vehicle 1. The control unit 31 may communicate with the electric system or other parts of the vehicle 1 using known transmission buses such as CAN-bus and/or wireless communication capabilities.

When the control unit 31 receives an indication that the electric system it is monitoring is powered on, the control unit 31 sends a control signal to the light source such that the light source illuminates the optical element whereby an optical signal emitted and the image 23 is visible. The light source may continuously be emitting light until the electric system is powered off, whereby the image 23 is visible until the electric system is powered off. In some implementations the lights source is switched off with some delay after the electric system is powered off.

Figure 3:
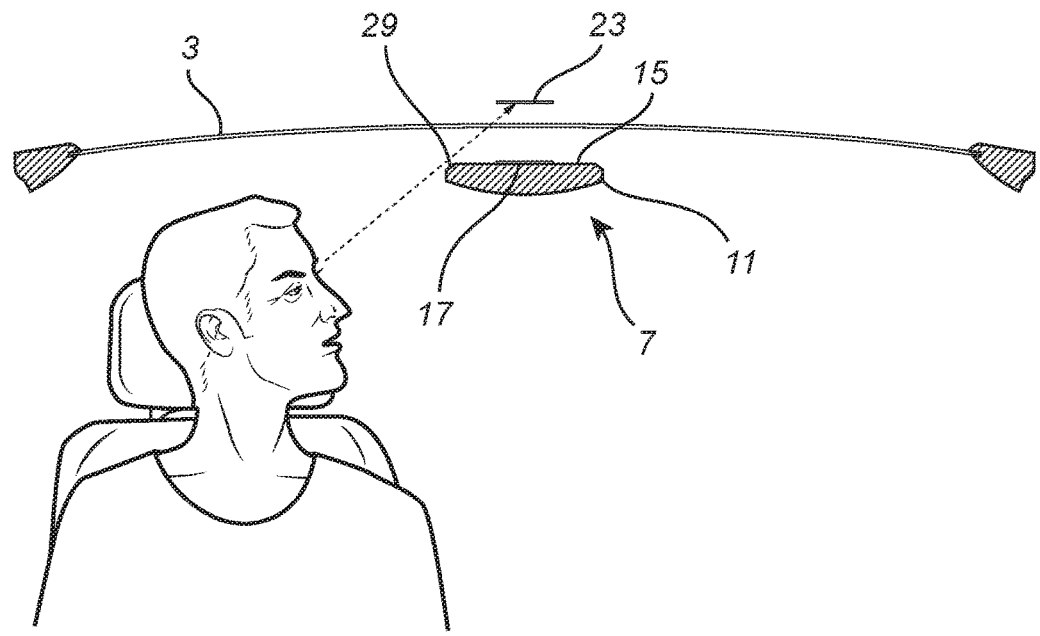
FIG. 3 conceptually illustrate front view of the interior of a vehicle according to embodiments of the invention.

In some possible implementations of the inventive concept, the light source is controlled by the electric system and thus does not require a specific control unit. Instead, power from the powered on electric system is supplied to the light source such that the light source may emit light towards the optical element. FIG. 3 illustrates a partial cross-sectional front view of the interior of the vehicle 1. FIG. 3 illustrates a cross-section of the rear portion 11 of the overhead console 7, the optical element 17 attached to the rear portion 11 facing the roof window 3. There is further shown the image 3 which is visible for the occupant in the vehicle, in this case the occupant is a passenger in the front seat of the car 1.

The rear portion 11 of the overhead console 7 comprises slanted edge portions 29. The slanted edge portions 29 are connected with the upper surface 15 of the rear portion 11 of the overhead console 7. The angle between the upper surface and the surface of the slanted edge 29 is less than 90 degrees. By the provision of edges between the upper surface 15 and the surface of the edge portions 29 in the form of slanted edges 29, improved line of sight for a driver or passenger in the front seat is improved as is schematically illustrated in FIG. 3.

Figure 4:
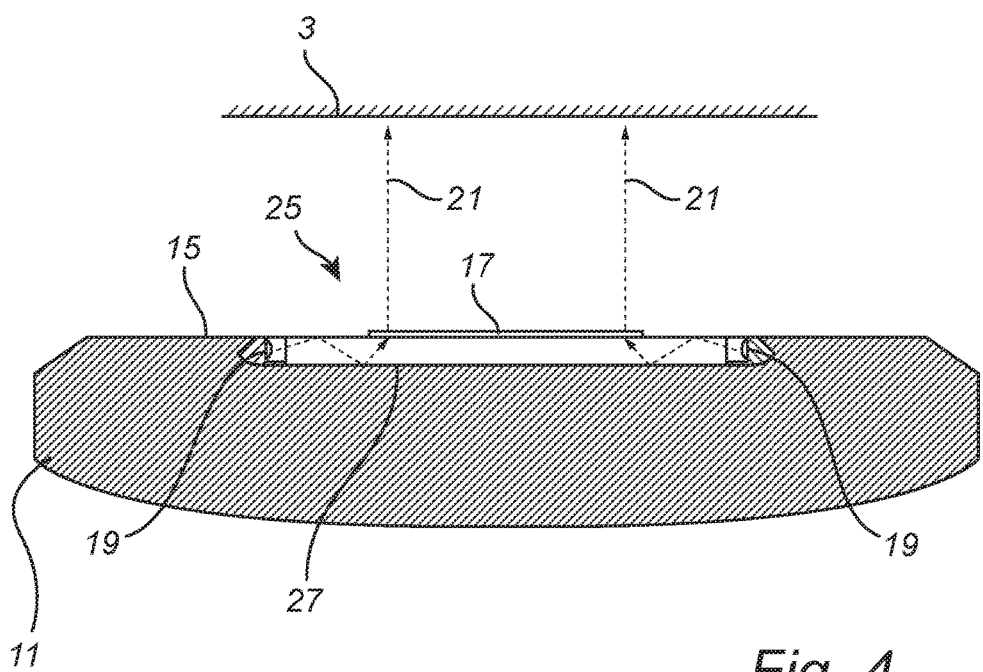
FIG. 4 conceptually illustrates a waveguide comprising an optical element.

FIG. 4 is a schematic cross-sectional view of the rear portion 11 of the overhead console 7. FIG. 4 illustrates a waveguide 25 comprising a main portion 27 which is arranged under the upper surface 15 of the rear portion 11 of the overhead console 7. The light source 19, here there are shown two light sources 19 arranged on opposite sides of the main portion 27 of the waveguide 25, are arranged to emit light into the main portion 27 of the waveguide 25. At least a portion of the light emitted from the light sources 19 is guided by the main portion 27 of the waveguide 25 to the optical element 17 whereby an optical signal 21 is transmitted from the optical element 17 towards the roof window 3.

The main part 27 of the waveguide is here shown to lie in a plane substantially parallel with the upper surface 15 of the of the rear portion 11 of the overhead console 7. This facilitates installation of the waveguide 25 and light sources 19 since the mounting location is relatively superficial. However, the main part 27 may equally well be arranged in other orientation as long as light emitted from the light sources may be transferred to the optical element 17.

Figure 5:
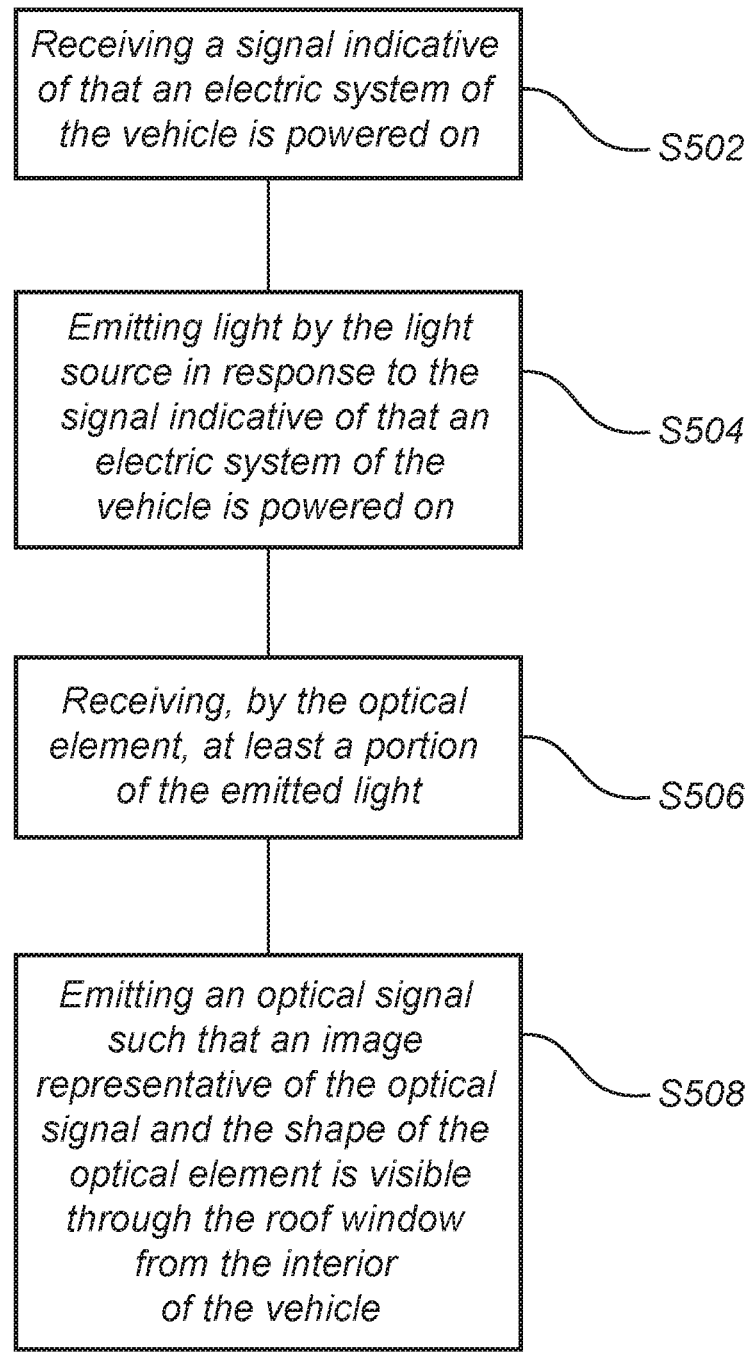
FIG. 5 is a flow-chart of method steps according to embodiments of the invention.

FIG. 5 is a flow-chart of method steps according to embodiments. In a first step S502 a signal is received indicative of that an electric system of the vehicle is powered on. In step S504 light is emitted by the light source in response to the signal indicative of that an electric system of the vehicle is powered on. Subsequently, in step S506, the optical element receives, at least a portion of the emitted light. In response to the received light, the optical element emits an optical signal towards the roof window in step S508 such that an image representative of the optical signal and the shape of the optical element is visible through the roof window from the interior of the vehicle, wherein the image is indicative of a state of the vehicle.

The light source is configured to emit light when an electric system of the vehicle is powered on. Different electrical systems are within the scope of the inventive concept which provides a versatile solution applicable to many different electrical systems.

As an example, the electric system may be the ambient light system inside the vehicle. When the ambient light system in the vehicle is turned on, for example when a vehicle door is unlocked or the ambient light system is independently switched on, then the light source 19 starts emitting light such that the optical element may produce the image 23. Thus, the image 23 indicates that the vehicle is unlocked and/or that the ambient light system is on. For example, in case ambient light sources are broken, the user is thus still given an indication that the ambient light system is powered on. If the vehicle doors are in an unlocked state, the image 23 provides an indication of that the vehicle doors are in an unlocked state. The light source may continue to emit light until a user manually locks the vehicle doors and/or the ambient light system is powered down. Furthermore, apart from receiving an indication that the ambient light system is on, the image advantageously produces additional light inside the vehicle.

Another exemplary electric system for which the inventive concept may be advantageously applied is the external lighting system of the vehicle. In this case the image is advantageously produced when the lighting system is on, for example in a state suitable for driving.

An ambient light system comprises light sources powered on inside the vehicle. The ambient light system may be controlled by a user by switching on/off using a switch inside the vehicle. The image 23 advantageously provides an indication that the ambient light system is powered on or powered off. Ambient light may be the light emitted from interior illumination in the vehicle that provides soft background light in the vehicle.

The state of the vehicle may be a state of the electric system.

It should be noted that the method steps may be performed in another order than what is depicted here. Thus the particular order described herein should not be considered limiting to the scope of the invention.

The control unit may include a microprocessor, microcontroller, programmable digital signal processor or another programmable device. The control unit may be a separate control unit for controlling the light source or may be a host control unit such as a control unit of the vehicle. The control unit may for example be comprised in a light source unit comprising the light source and the control unit.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

What is claimed is:

1. A vehicle comprising:
   an optically transmissive roof window arranged in a roof of the vehicle;
   a overhead console arranged in an overhead position with respect to a driver position in the vehicle, the overhead console is attached to the vehicle interior in a frontal location in the vehicle with respect to the roof window, wherein a rear portion of the overhead console extends under the roof window such that a vertical gap is formed between the roof window and an upper surface of the rear portion, the upper surface facing the roof window,
   an optical element attached to the rear portion of the overhead console, the optical element facing the roof window, and
   a light source arranged in the rear portion of the overhead console for emitting light receivable by the optical element, wherein said light source is configured to emit light when an electric system of the vehicle is powered on,
   wherein the optical element is arranged to receive at least a portion of the light emitted by the light source such that the optical element is illuminated by the emitted light which causes an optical signal to be emitted from the optical element towards the roof window, wherein an image representative of the optical signal and a shape of the optical element is visible in the roof window from the interior of the vehicle and, wherein the image is indicative of a state of the vehicle.

2. The vehicle according to claim 1, wherein the light source is configured to continuously emit light until the electric system is powered off.

3. The vehicle according to claim 1, wherein the image representative of the optical signal and the shape of the optical element appears as a projection on an opposite side of the roof window from the rear portion of the overhead console outside the vehicle.

4. The vehicle according to claim 1, wherein the vertical gap is less than or equal to about 200 mm, 150 mm, 100 mm, about 80 mm, about 50 mm, about 40 mm, about 30 mm, or about 20 mm.

5. The vehicle according to claim 1, wherein the image representative of the optical signal and the shape of the optical element is visible to at least a driver of the vehicle.

6. The vehicle according to claim 1, wherein the optical element is an at least partly optically diffusive element configured to at least partly spread the light received from the light source.

7. The vehicle according to claim 1, wherein the optical element is comprised in a waveguide, wherein a main portion of the waveguide is covered by the upper surface of the rear portion of the overhead console, wherein the main portion of the waveguide is configured to transmit light received from the light source towards the optical element.

8. The vehicle according to claim 1, wherein the overhead console comprises edge portions connected with the upper surface, wherein an angle between the upper surface and the edge portion is such that the edge portion is a slanted edge.

9. The vehicle according to claim 1, wherein the upper surface lies in a generally horizontal plane.

10. The vehicle according to claim 1, wherein the shape of optical element is static, whereby the image is also static.

11. The vehicle according to claim 1, comprising a control unit configured to receive a signal indicative of that the electric system of the vehicle is powered on, and to control the light source to emit light in response to the received signal.

12. The vehicle according to claim 11, wherein the control unit is configured to receive an indication that the electric system is powered off, and in response to receiving that indication, control the light source to stop emitting light.

13. The vehicle according to claim 1, wherein the vehicle is a car.

14. The vehicle according to claim 1, wherein the electrical system is at least one of an ambient light system, an external light system, a door locking system, an ignition system, or a combination thereof.

15. A method for providing an image indicative of a state of a vehicle, the vehicle comprising:
   an optically transmissive roof window arranged in a roof of the vehicle;
   a overhead console arranged in an overhead position with respect to a driver position in the vehicle, the overhead console is attached to the vehicle interior in a frontal location in the vehicle with respect to the roof window, wherein a rear portion of the overhead console extends under the roof window such that a vertical gap is formed between the roof window and an upper surface of the rear portion, the upper surface facing the roof window,
   an optical element attached to the rear portion of the overhead console, the optical element facing the roof window, and
   a light source arranged in the rear portion of the overhead console, wherein the method comprises:
   receiving a signal indicative that an electric system of the vehicle is powered on,
   emitting light by the light source in response to the signal indicative that the electric system of the vehicle is powered on,
   receiving, by the optical element, at least a portion of the emitted light, and
   in response to the received light, emitting, by the optical element, an optical signal towards the roof window such that the image indicative of the state of the vehicle and a shape of the optical element is visible through the roof window from the interior of the vehicle.

* * * * *